(12) United States Patent
Roelle et al.

(10) Patent No.: US 10,424,201 B2
(45) Date of Patent: Sep. 24, 2019

(54) VEHICLE ASSISTANCE DEVICE

(71) Applicant: Bayerische Motoren Werke Aktiengesellschaft, Munich (DE)

(72) Inventors: Christopher Roelle, Groebenzell (DE); Markus Strassberger, Wartenberg (DE); Karl-Ernst Steinberg, Munich (DE); Bernhard Niedermaier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/133,255

(22) Filed: Sep. 17, 2018

(65) Prior Publication Data

US 2019/0035272 A1 Jan. 31, 2019

Related U.S. Application Data

(63) Continuation of application No. 14/699,504, filed on Apr. 29, 2015, now abandoned, which is a
(Continued)

(51) Int. Cl.
*G08G 1/133* (2006.01)
*B60W 50/14* (2012.01)
*B60W 50/00* (2006.01)

(52) U.S. Cl.
CPC ............. *G08G 1/133* (2013.01); *B60W 50/14* (2013.01); *B60K 2370/186* (2019.05);
(Continued)

(58) Field of Classification Search
None
See application file for complete search history.

(56) References Cited

U.S. PATENT DOCUMENTS

| 5,757,359 A | 5/1998 | Morimoto et al. |
| 5,781,872 A | 7/1998 | Konishi et al. |

(Continued)

FOREIGN PATENT DOCUMENTS

| CN | 1802273 A | 7/2006 |
| CN | 101391578 A | 3/2009 |

(Continued)

OTHER PUBLICATIONS

International Search Report (PCT/ISA/210) dated Apr. 17, 2014, with English translation (six (6) pages).
(Continued)

*Primary Examiner* — Chico A Foxx
(74) *Attorney, Agent, or Firm* — Crowell & Moring LLP

(57) ABSTRACT

A vehicle assistance device includes a control device for controlling the display of information and a display for displaying the information. When the control device has determined a state of the vehicle and/or a position of the vehicle, the control device takes the determined state of the vehicle and/or the determined position of the vehicle as a basis for providing information for the driver on the display device. When changing between mobility sections in which different information may be of interest to the driver, the vehicle assistance device can provide a driver with the necessary information for each of the mobility sections.

12 Claims, 4 Drawing Sheets

Related U.S. Application Data continuation of application No. PCT/EP2013/071960, filed on Oct. 21, 2013.

(52) U.S. Cl.
CPC ............... *B60W 2050/0064* (2013.01); *B60W 2050/0089* (2013.01); *B60W 2050/146* (2013.01); *B60W 2520/00* (2013.01); *B60W 2540/22* (2013.01); *B60W 2540/28* (2013.01); *B60W 2550/10* (2013.01); *B60W 2550/40* (2013.01); *B60W 2550/402* (2013.01)

(56) References Cited

U.S. PATENT DOCUMENTS

| | | | |
|---|---|---|---|
| 6,275,231 | B1 | 8/2001 | Obradovich |
| 7,171,304 | B2 | 1/2007 | Wako |
| 7,286,931 | B2 | 10/2007 | Kawasaki |
| 7,398,155 | B2 | 7/2008 | Ichida |
| 7,519,471 | B2 | 4/2009 | Shibata et al. |
| 7,634,228 | B2 | 12/2009 | White et al. |
| 7,899,615 | B2 | 3/2011 | Arnold-Huyser et al. |
| 7,911,361 | B2 | 3/2011 | Kumabe |
| 7,991,546 | B2 | 8/2011 | Iao |
| 8,195,106 | B2 | 6/2012 | Jung et al. |
| 8,423,250 | B2 | 4/2013 | Kondou et al. |
| 8,525,723 | B2 | 9/2013 | Orr et al. |
| 8,633,811 | B2 | 1/2014 | Ikeda et al. |
| 8,806,613 | B2 * | 8/2014 | Zafiroglu ............ H04L 63/0823 726/17 |
| 8,841,998 | B2 | 9/2014 | Yamada et al. |
| 8,880,240 | B2 | 11/2014 | Grimm et al. |
| 9,140,568 | B2 * | 9/2015 | Waite ..................... B60K 35/00 |
| 9,744,873 | B2 * | 8/2017 | Riley ....................... B60L 3/12 |
| 2002/0183924 | A1 | 12/2002 | Yokota |
| 2003/0083807 | A1 | 5/2003 | Kuroda et al. |
| 2003/0146891 | A1 * | 8/2003 | Poliakine ............. G06F 3/1446 345/87 |
| 2004/0049336 | A1 | 3/2004 | Knockeart et al. |
| 2004/0230350 | A1 | 11/2004 | Ogawa et al. |
| 2005/0071079 | A1 | 3/2005 | Godfrey et al. |
| 2005/0107952 | A1 | 5/2005 | Hoshino et al. |
| 2006/0085125 | A1 | 4/2006 | Shibata et al. |
| 2007/0078598 | A1 | 4/2007 | Watanabe et al. |
| 2007/0126604 | A1 | 6/2007 | Thacher |
| 2008/0307356 | A1 | 12/2008 | Kawauchi |
| 2009/0146846 | A1 | 6/2009 | Grossman |
| 2010/0087981 | A1 * | 4/2010 | Orozco-Perez ......... H04L 67/12 701/29.5 |
| 2010/0283597 | A1 | 11/2010 | Yoda et al. |
| 2011/0275415 | A1 | 11/2011 | Lee et al. |
| 2012/0015690 | A1 | 1/2012 | Miao |
| 2012/0056736 | A1 | 3/2012 | Katoh |
| 2012/0110466 | A1 | 5/2012 | Tan |
| 2012/0209506 | A1 | 8/2012 | Tamayama et al. |
| 2013/0147840 | A1 * | 6/2013 | Seder ...................... G06T 3/005 345/633 |
| 2013/0194089 | A1 * | 8/2013 | Estrada .................. G08B 21/22 340/457 |
| 2014/0005919 | A1 | 1/2014 | Mattila |
| 2015/0191122 | A1 * | 7/2015 | Roy ...................... G08G 1/0962 340/439 |
| 2015/0363087 | A1 | 12/2015 | Lee |

FOREIGN PATENT DOCUMENTS

| | | |
|---|---|---|
| CN | 101932915 A | 12/2010 |
| CN | 102396008 A | 3/2012 |
| DE | 10 2006 017 855 A1 | 11/2007 |
| DE | 10 2008 026 186 A1 | 12/2009 |
| DE | 10 2009 050 056 A1 | 5/2011 |
| DE | 10 2010 038 539 A1 | 2/2012 |
| DE | 10 2012 003 921 A1 | 8/2013 |
| EP | 2 420 985 A1 | 2/2012 |
| WO | WO 2004/108466 A1 | 12/2004 |

OTHER PUBLICATIONS

German Search Report dated Oct. 17, 2013, with partial English translation (nine (9) pages).

Sokolov, D., "Google Now: Privatsekretär aus der Wolke", Heise online, http://www.heise.de/newsticker/meldung/Google-Now-Privatsekretaer-aus-der-Wolke-1627534.html, Jun. 28, 2012, (six (6) pages).

Chinese-language Office Action issued in counterpart Chinese Application No. 201380056313.2 dated Jul. 28, 2016 with English translation (22 pages).

European-language Written Opinion (PCT/ISA/237) issued in PCT Application No. PCT/EP2013/071960 dated Apr. 17, 2014 (Ten (10) pages).

* cited by examiner

VEHICLE ASSISTANCE DEVICE

CROSS REFERENCE TO RELATED APPLICATIONS

This application is a continuation of Ser. No. 14/699,504, filed Apr. 29, 2015 which is a continuation of PCT International Application No. PCT/EP2013/071960, filed Oct. 21, 2013, which claims priority under 35 U.S.C. § 119 from German Patent Application No. 10 2012 219 924.1, filed Oct. 31, 2012, the entire disclosures of which are herein expressly incorporated by reference.

BACKGROUND AND SUMMARY OF THE INVENTION

The invention relates to a vehicle assistance device for displaying information for an occupant of a vehicle. Furthermore, the invention relates to a vehicle having such a vehicle assistance device and to a system for providing data for a vehicle assistance device.

During a trip by a vehicle, the vehicle changes between various physical zones or physical contexts that have various peculiarities or specifics. The foibles associated with each trip section may be of particular interest to a driver. By way of example, this relates to a border crossing into another country, the arrival at various destinations or else multimodal mobility activities, that is to say the use of various means of transport.

It is desirable to provide a vehicle assistance device that, when a particular state of the vehicle arises or when the state is terminated or when a physical area is entered or left, provides specific information for a driver for the state or the physical area. Furthermore, a vehicle having such a vehicle assistance device is intended to be provided. A further object of the present invention is to provide a system for providing data for a vehicle assistance device in a vehicle that allows specific information concerning a particular state of the vehicle or concerning a particular physical area in which a vehicle is currently located to be provided for the driver.

According to one embodiment, the vehicle assistance device comprises a control device for controlling the display of information, a display device for displaying the information, a position locating device for ascertaining the position of the vehicle, a sensor device for establishing a state of the vehicle and a memory device having a first memory for storing states of the vehicle and having a second memory for storing positions. The control device is configured such that the control device compares the ascertained state of the vehicle with the states of the vehicle that are stored in the first memory and compares the ascertained position of the vehicle with the positions of the vehicle that are stored in the second memory. The control device is configured such that the control device displays the information on the display device when the control device establishes that the ascertained state of the vehicle matches a state that is stored in the first memory and/or the ascertained position of the vehicle matches a position that is stored in the second memory.

The vehicle assistance device provides a mobility service that proactively assists a driver, under system initiation, when changing between two different mobility sections in which different rules, specifics or peculiarities apply or in which different information is of interest to the driver. The vehicle assistance device can provide different information when entering a physical zone or when leaving the physical zone. When entering a particular travel section, for example, the display device of the vehicle assistance device can be used to display a welcome menu with important information relating to the travel section. When leaving the route section, a farewell menu with information that may be of interest when leaving the route section can be displayed.

The interaction with the vehicle assistance device can take place on various equipment in the vehicle. By way of example, the display device may be a display that is part of the infotainment system of the vehicle, a user programmable display that is arranged in the combination instrument of the vehicle or a head up display. Input and output can be effected using various input/output arrangements, for example visually or audibly. The welcome menu and the farewell menu with their respective information can be presented either on the same display device or on different display devices, or in combination on one display device.

A change between travel sections or a change of mobility context takes place particularly in the following situations: at the beginning of mobility, that is to say before the beginning of the actual trip, for example from home, from a hotel or from the workplace; when changing the means of transport, for example when changing between automobile, bicycle, bus, train, rental automobile, automobile-carrying train, ferry, airplane, ship or walking; during interruptions to a trip, particularly during breaks/rest, when filling up, when performing services or during relatively long waiting times; in the event of changes in cognitive requirements, for example when changing to automated driving; when entering regions with different legal regulations, particularly when crossing borders or when entering environmental zones and city toll zones; when entering privately organized areas, particularly when driving into parking lots, into parking garages, into underground parking garages or onto company premises or when leaving same and at the end of the trip.

According to one embodiment, a system for providing data for a vehicle assistance device in a vehicle comprises a vehicle having a vehicle assistance device as described above and a device external to the vehicle for providing the information for the vehicle assistance device of the vehicle. The device for providing the information has a memory device for storing data. The device for providing the information has a control device for selecting the information from the data stored in the memory device. The control device is designed to select the information from the data stored in the memory device on the basis of the state of the vehicle as ascertained by the vehicle assistance device and/or on the basis of the position of the vehicle as ascertained by the vehicle assistance device. The device for providing the information sends the information to the vehicle assistance device of the vehicle when the control device has made the request to the vehicle assistance device to send the information to the external device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
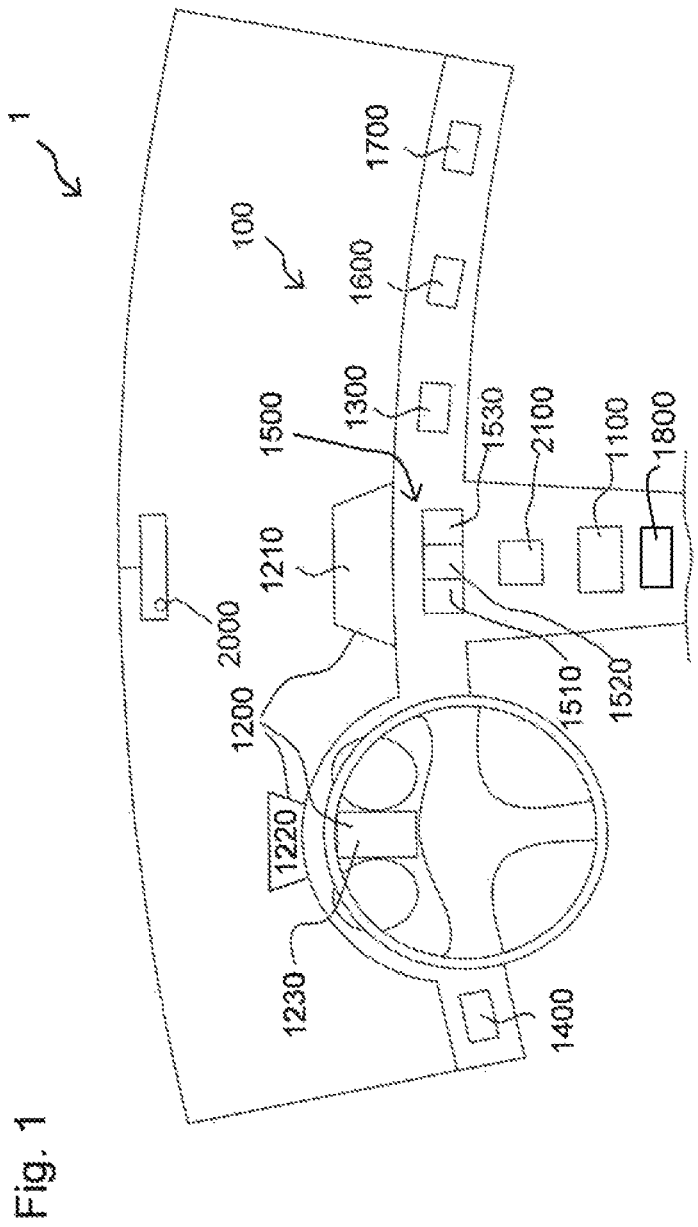
FIG. 1 is a schematic diagram of an embodiment of a vehicle with a vehicle assistance device for providing information for a driver of the vehicle.

FIG. 1 shows the interior of a vehicle 1 having an embodiment of a vehicle assistance device 100 for providing information for the driver of the vehicle on the basis of the occupancy of different physical zones by the vehicle. The vehicle assistance device 100 includes a control device 1100 for controlling the display of the information on a display device 1200 for displaying the information. The display device may be in the form of a central display 1210 of an infotainment system of the vehicle, in the form of a user programmable display 1220 in the instrument cluster of the vehicle or in the form of a head up display 1230 of the vehicle.

The vehicle assistance device 100 additionally includes a position locating device 1300 for ascertaining the position of the vehicle 1, at least one sensor device 1400 for establishing a state of the vehicle 1 and a memory device 1500 having a memory 1510 for storing states of the vehicle and having a memory 1520 for storing positions of the vehicle.

The control device 1100 is configured such that it compares the states of the vehicle that are ascertained by the at least one sensor device 1400 with the states of the vehicle that are stored in the memory 1510 and/or compares the position of the vehicle 1 as ascertained by the position locating device 1300 with the positions of the vehicle that are stored in the memory 1520. The control device 1100 displays the information on the display device 1200 when the control device establishes that the ascertained state of the vehicle 1 matches a state that is stored in the memory 1510 and/or the ascertained position of the vehicle 1 matches a position that is stored in the memory 1520.

By way of example, the memory 1510 may store the states "Shut driver's door; Switch on ignition". When the driver opens the driver's door of the vehicle, gets into the vehicle, shuts the door again and switches on the ignition, for example, the sensor device 1400 determines these states and compares them with the states stored in the state memory 1510. When the control device 1100 establishes that the state memory 1510 stores the determined state "Shut driver's door; Switch on ignition", the control device 1100 displays information that is associated with this state. By way of example, a welcome menu of information before the beginning of a trip is displayed on the display device 1200.

Figure 2:
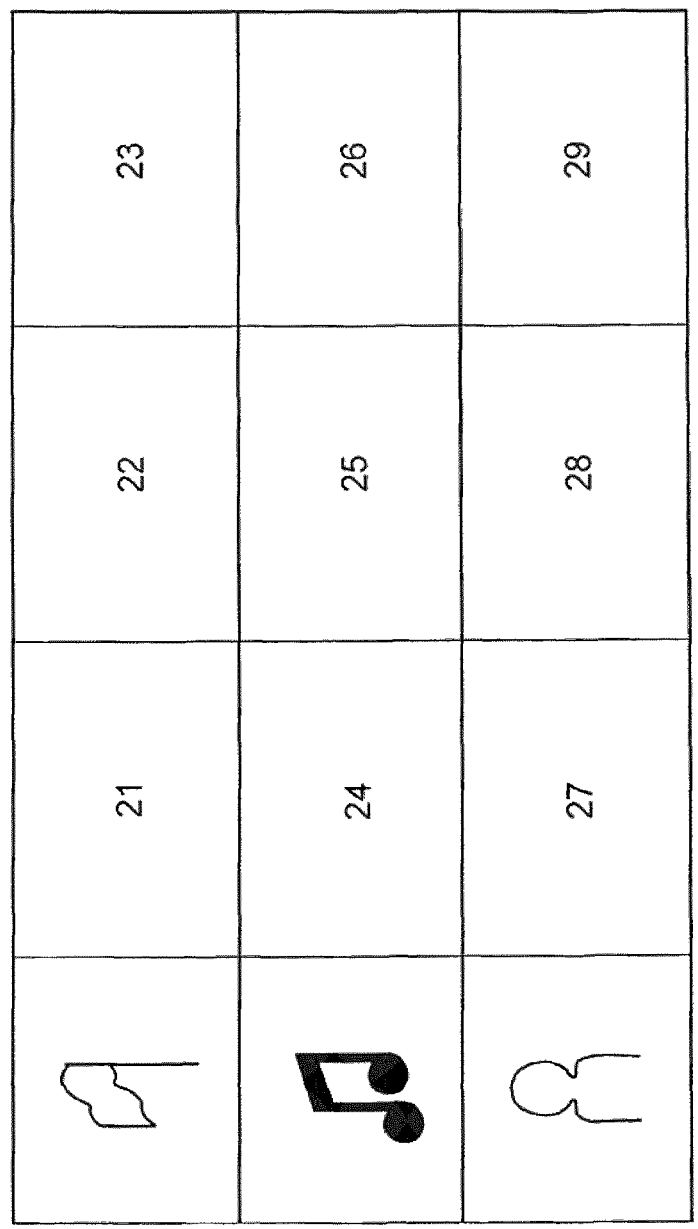
FIG. 2 shows a display of information from a welcome menu on a display device.

FIG. 2 shows an example of information that can be displayed on the display device 1200 in the welcome menu before the beginning of a trip. By way of example, the first row of the screen can be used to indicate a selection of various destinations 21, 22 and 23 that the driver has often or recently driven to or that the driver usually drives to at a particular time. The second row can be used to display a selection of entertainment options during the pending trip. By way of example, the driver can push a button on the display to select whether he wishes to listen to the radio by pushing a panel 24, wishes to listen to a particular piece of music or a CD by pushing the panel 25 on the screen or wishes to play a video by pushing a screen panel 26.

Figure 3:
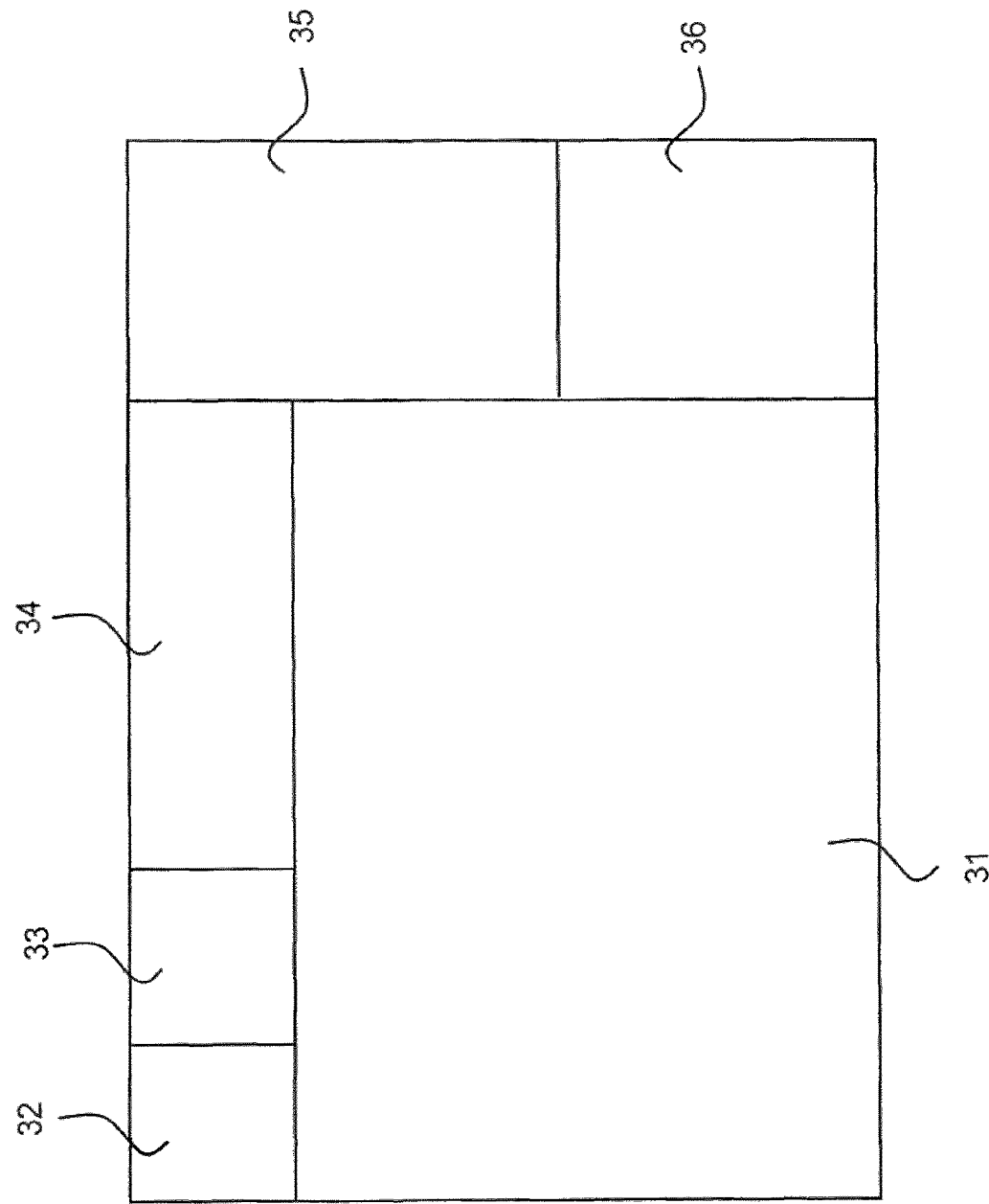
FIG. 3 shows a display of information from a farewell menu.

FIG. 3 shows an example of information that the control device 1100 displays on the display device 1200 in a farewell menu, for example at the end of a trip, when the vehicle is being parked at a location. In the present example, an image detail 31 from the display device 1200 is used to display to the driver a road map that indicates the path from a parking position to a destination. Furthermore, the distance covered from the beginning of the trip can be displayed in an image detail 32 and the time required therefor can be displayed in an image detail 33. An image detail 34 is used to inform the driver about the technical state of the vehicle by showing the information "All technical systems OK", for example, in the image panel 34 when a fault-free state is established. By way of example, an image detail 35 is used to indicate to the driver that the position that the automobile is currently in requires a parking ticket to be taken. The image detail 36 is used to display information concerning the departure time of buses from a nearby bus stop.

The control device 1100 can display first pieces of the information on the display device when the control device establishes that the determined state of the vehicle changes from a state that is not stored in the memory 1510 to a state that is stored in the memory 1510. Furthermore, the control device 1100 can display information on the display device when the control device establishes that the ascertained position of the vehicle changes from a position that is not stored in the memory 1520 to a position that is stored in the memory 1520. By way of example, the first information is part of a welcome menu that is displayed on the display device when the vehicle enters a physical area whose position coordinates are stored in the memory 1520.

The control device 1100 can display second information, which is different than the first information, on the display device when the control device 1100 establishes that the determined state of the vehicle changes from a state that is stored in the memory 1510 to a state that is not stored in the memory 1510. Furthermore, the control device 1100 can display the second information when the control device 1100 establishes that the position of the vehicle changes from a position that is stored in the memory 1520 to a position that is not stored in the memory 1520. By way of example, the second information is part of a farewell menu that is displayed on the display device when the vehicle leaves a physical area whose position coordinates are stored in the memory 1520.

The vehicle assistance device 100 may include a reception device 1600 for receiving data that are provided by an external device outside the vehicle. The control device 1100 displays the data provided by the external device on the display device 1200 when the control device 1100 establishes that the ascertained state of the vehicle 1 matches a state that is stored in the memory 1510 and/or a position of the vehicle 1 as ascertained by the position locating device 1300 matches a position that is stored in the memory 1520.

Figure 4:
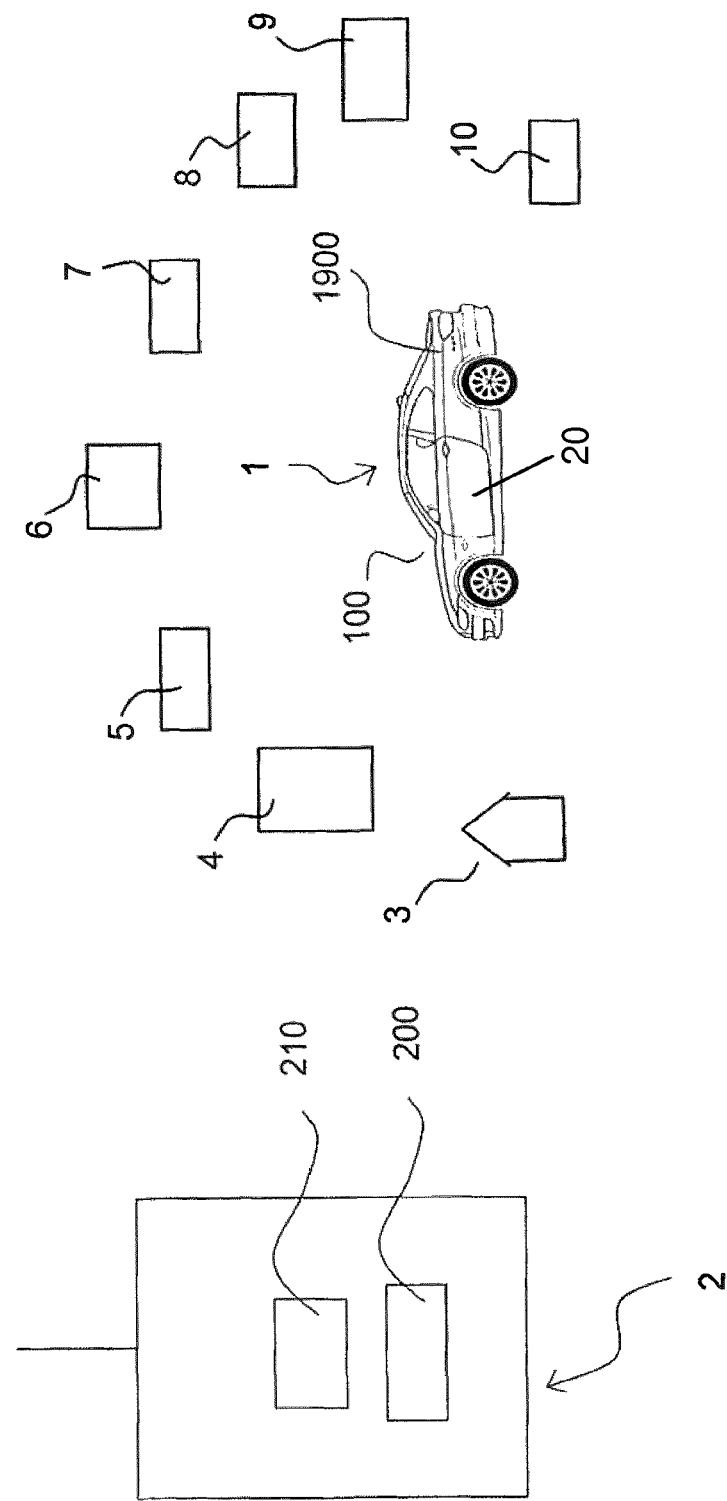
FIG. 4 is a schematic diagram of an embodiment of a system for providing data for a vehicle assistance device in a vehicle.

For the purpose of illustration, FIG. 4 shows a scenario with a vehicle 1 that includes a vehicle assistance device 100. The reception device 1600 can receive the data to be presented on the display device 1200 as information from the welcome menu or as information from the farewell menu from a multiplicity of external devices. By way of example, these external devices include a control center or a back end 2 of the vehicle manufacturer, an apartment or a house 3 of the driver, a private or public company 4, for example the workplace of the driver, a hotel/restaurant 5, a service provider 6 for providing services for the vehicle, particularly a filling station, a shop 7, for example a supermarket, a company 8 for public local passenger traffic, for example a local bus/train company or an airport operator, a parking lot/parking garage 9 or a rental automobile/taxi control center 10. It should be pointed out that the external devices listed are merely examples of external data sources for the vehicle assistance device 100 and are therefore not intended to be understood as restrictive.

In order to obtain the information from one of the external devices, the vehicle assistance device 100 includes a transmission device 1700 for sending a request to an external device to send data to the vehicle assistance device 100. The control device 1100 is configured such that the control device sends a request to send the data to one of the external devices when the control device 1100 establishes that the current state of the vehicle 1 as ascertained by the sensor device 1400 changes from a state that is not stored in the memory 1510 to a state that is stored in the memory 1510 and/or when the control device 1100 establishes that the current position of the vehicle as ascertained by the position locating device 1300 changes from a position that is not stored in the memory 1520 to a position that is stored in the memory 1520. When the information is intended to be obtained from one of the external devices 2, . . . , 10, the transmission device 1700 is therefore able, when a particular state is established as being entered or when a defined physical area is established as being entered, to send a request to one of the external devices to send information for display in the welcome menu.

Furthermore, the control device 1100 can send a request to send the data to one of the external devices 2, . . . , 10 when the control device 1100 establishes that the current state of the vehicle 1 as ascertained by the sensor device 1400 changes from a state that is stored in the memory 1510 to a state that is not stored in the memory 1510 and/or when the control device 1100 establishes that the current position of the vehicle as ascertained by the position locating device 1300 changes from a position that is stored in the memory 1520 to a position that is not stored in the memory 1520. When the information is intended to be obtained from one of the external devices 2, . . . , 10, the transmission device 1700 is therefore able, when a particular state is established as being terminated or when a defined physical area is established as being left, to send a request to one of the external devices to send information for display in the farewell menu.

The external devices 3, . . . , 10 can communicate with the vehicle assistance device 100 of the vehicle directly or can, alternatively, send the information provided by them to the control center/back-end 2 of the vehicle manufacturer first of all. The vehicle assistance device 100 then receives the information to be displayed on the display device 1200 for the welcome menu or for the farewell menu from the control center/back-end 2.

The external device 2 may have a memory device 200 for storing a multiplicity of data. When the vehicle assistance device 100 has made the request to send the data, a control unit 210 of the device 2 takes the state of the vehicle as established by the vehicle assistance device 100 and/or the position of the vehicle as established by the vehicle assistance device as a basis for selecting data from the memory device 200, and the device 2 transmits this data to the vehicle assistance device 100. From the transmitted data, the control device 1100 generates the information that is presented on the display device 1200. Alternatively, the external devices 3, . . . , 10 can send the data provided by them to the vehicle assistance device directly too.

The data provided by the external devices 3, . . . , 10 can denote the state of the respective external device. Some examples of possible information to be displayed that the control device 1100 can produce from the data provided by the external devices 3, . . . , 10 are specified below.

When the control device 1100 established that the driver of the vehicle is leaving for his house/apartment 3, the farewell menu can be used to display a status and actions relating to the home automation. Similarly, when the home area 3 is approached, the welcome menu can be used to display the status of the home automation. Furthermore, by way of example, short videos of visitors who have rung the bell of the house/apartment 3 during the driver's absence, notifications of delivery attempts for packages/letters, electronic messages/notes from other occupants or automatically recorded articles from various media can be displayed.

When the control device 1100 establishes that the driver of the vehicle is approaching his workplace 4, information can be obtained from the workplace. This information may be displayed in the welcome menu and may relate to essential tasks for the day, electronic communications from colleagues, appointment overviews or information relating to vehicle fleet management, for example. When the control device 1100 establishes that the driver, after getting into the vehicle, which is to leave the physical area of the workplace, the control device 1100 uses the display device 1200 to display a farewell menu with information relating to the hours of work that day, overtime, clocking out information or the appointments pending on the next day.

When the control device 1100 establishes that the vehicle is approaching a hotel/restaurant 5, the welcome menu is used to display general hotel/restaurant information, information pertaining to the location of/access to parking options, information pertaining to opening times for reception, pertaining to room occupancy/reservations, pertaining to the menu or pertaining to payment options. When the control device 1100, after evaluating the data ascertained by the position locating device 1300 and the sensor device 1400, establishes that the driver wishes to leave the restaurant/hotel area, the farewell menu is used to display information pertaining to the check, pertaining to payment for the underground parking garage or pertaining to the hotel rating.

When the control device 1100 establishes that the vehicle approaches a filling station 6, the driver stops there and the engine is switched off, the control device 1100 uses the welcome menu to display information relating to a layout plan for gas pumps, free gas pumps, price information, the range of goods at the filling station or payment options at the filling station on the display device 1200. When the control device 1100 establishes, by evaluating the sensor device 1400, that the driver wishes to leave the filling station again after filling up, the farewell menu on the display device is used to display information pertaining to the tank fill, the price, the amount of gas filled and a rating option for the filling station.

When the control device 1100 establishes that the vehicle approaches a shop 7, and stops in the parking lot of the shop, for example, the welcome menu on the display device is used to display information relating to opening times of the shop, vouchers/coupons from the shop, a directory for the shop or departments in the shop. When the control device 1100 establishes, by evaluating the position locating device 1300 and the sensor device 1400, that the driver, after making a purchase, gets back into the vehicle again in the parking lot of the shop, shuts the driver's door and switches on the ignition, the control device can infer that the driver wishes to leave the physical area of the shop 7. In this case, data that contain information for the farewell menu are received from the back end 2 or from the shop 7 directly. The information displayed on the display device may contain an overview of the purchase, a check against the shopping list or special information about the shop.

When the control device 1100 establishes that the vehicle 1 approaches a company for public local passenger transport 8 and stops the vehicle there, the control device uses the welcome menu on the display device to display information relating to an overview of the stops, of the railroad station or of the airport. Furthermore, the welcome information displayed may be the next connections, the time to departure, current departure times for the individual routes, fares, payment options and advice, specific advice for foreigners or other specifics, for example train cancellations, faults on the line, replacement rail transport or platform changes. When the control device establishes that the physical area of a stop, a railroad station or an airport is being left, a farewell menu can be used to display information relating to the time saved, the exhaust emissions avoided from one's own vehicle and the money paid for the bus/rail trip or the flight.

When the control device 1100 establishes that the vehicle 1 is approaching a parking lot or parking garage 9, the vehicle assistance device 100 makes a request to the back end 2, for example, to provide information for display in the welcome menu. The back end 2 then sends data to the vehicle assistance device 100, from which data the control device 1100 generates information relating to a layout of the parking lot/parking garage, the denotation of free parking spaces, the maximum parking period, the prices, a check on a probable parking period, an estimate of the price that possibly needs to be paid, advice of special parking spaces or advice pertaining to specific services of the parking lot/parking garage operator. When the control device 1100 establishes that the driver of the vehicle wishes to leave the parking lot/parking garage, the control device 1100 uses the display device to display information relating to the parking period and the price paid.

When the control device 1100 establishes that the vehicle approaches a rental automobile control center or a taxi stand 10 and the driver stops the vehicle there, the control device displays the probable time of arrival of a taxi, the location of the taxi, the estimated fare, the estimated journey time in the taxi, an image of the driver or use information for a rental automobile, as welcome information. When the control device 1100 establishes that the driver gets back into the vehicle after a relatively long parking time close to the rental automobile control center or the taxi stand, the control device 1100 uses the display device to display information from a farewell menu. By way of example, this information may relate to the fare/rental price, pre-reservation of the next taxi/rental automobile, specifics of the trip, bonus miles collected or return information for a rental automobile.

According to a further embodiment, the control device 1100 of the vehicle assistance device may be configured such that data that are provided by the sensor device 1400 of the vehicle are displayed on the display device 1200 when the control device 1100 establishes that the ascertained state of the vehicle 1 matches the state that is stored in the memory 1510 and/or the ascertained position of the vehicle 1 matches the position that is stored in the memory 1520. Hence, the control device provides a driver not just with information that it receives from the control center/back-end 2 or one of the external devices 3, ..., 10 but also with information that it produces from the sensor data from the vehicle.

Furthermore, the vehicle assistance device 100 includes an input device 1800 for programming the control device 1100 to display data that relate to the state of components of the vehicle, to the state of objects that are not part of the vehicle, to the state of the surroundings of the vehicle or to the occurrence of events, for example. The control device 1100 is in a form that is programmable such that the control device takes the programming of the control device as a basis for displaying the data on the display device 1200 when the control device 1100 establishes that the ascertained state of the vehicle 1 matches the state that is stored in the memory 1510 and/or the ascertained position of the vehicle matches the position that is stored in the memory 1520.

Hence, a user can stipulate the information with which he is provided in the welcome menu or in the farewell menu of a particular vehicle state or a particular physical area himself. In the third screen row of a welcome menu that is displayed on the display device 1200 immediately after switching on the ignition, for example, FIG. 2 shows, in a screen panel 27, information concerning attempts of making contact by persons who, for example allegedly, have attempted to call the driver on his Smartphone, or, in a screen panel 28, information concerning persons who the driver would himself like to call soon, or, in a panel 29 of the screen, information relating to persons from whom the driver has received an as yet unread e-mail.

The control device 1100 can also be programmed by a user such that the display of information that would usually be displayed on the display device when a particular vehicle state and/or a particular position of the vehicle is established is suppressed. If the workplace of the driver is in proximity to a railroad station, for example, the driver can program the control device 1100 in a suitable fashion in order to prevent the information provided by a nearby railroad station device from being displayed in a welcome menu whenever the vehicle is parked in the parking lot of his office.

The vehicle assistance device may additionally include an object recognition device 1900 for recognizing objects 20 in the vehicle 1. By way of example, the objects 20 may be objects that are not part of the vehicle. The object recognition device 1900 may be arranged in the trunk of the vehicle. The control device 1100 is in a form such that it indicates the presence and the state of the object 20 in the vehicle 1 on the display device 1200 when the control device 1100 establishes that the ascertained state of the vehicle 1 matches the state that is stored in the memory 1510 and/or the ascertained position of the vehicle 1 matches a position that is stored in the memory 1520. By way of example, this allows a welcome menu to be used to indicate that the vehicle does not contain an umbrella when the object recognition device 1900 has established that the trunk of the vehicle does not contain an umbrella and the sensor device 1400 establishes that precipitation is hitting the windshield of the vehicle.

According to a further embodiment, the vehicle assistance device may include a sensor 2000 for ascertaining data that denote a physical and/or psychological state of the driver. By way of example, the sensor may be a biometric sensor that is arranged in the interior mirror of the vehicle and, by way of example, can sense the facial expression of the driver for evaluation by the control device 1100. The control device can select the information to be displayed on the basis of the ascertained state of the driver.

All of the data that are produced by one of the external devices 2, ..., 10, by the sensor device 1400, by the object recognition device 1900 or by the sensor 2000 can be provided for the control device for evaluation and for generation of information on the display device 1200 in a shared data interface 2100. Hence, the information is available to the system regardless of the source of the information.

LIST OF REFERENCE SYMBOLS

1 Vehicle
2 Control center/back end
3 Apartment/house
4 Company/workplace

5 Hotel/restaurant
6 Filling station
7 Shop
8 Service company for local passenger transport
9 Parking lot/parking garage
10 Taxi/rental automobile control center
20 Object in vehicle
100 Vehicle assistance device
1100 Control device
1200 Display device
1300 Position locating device
1400 Sensor device
1500 Memory device
1600 Reception device
1700 Transmission device
1800 Input device
1900 Object recognition device
2000 Sensor
2100 Data interface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle assistance apparatus comprising:
   a control device configured to control the display of information;
   a display device configured to display the information;
   a position finding device configured to ascertain the position of the vehicle;
   at least one sensor device configured to ascertain a state of the vehicle;
   a reception device configured to receive first data that are provided by an external device outside the vehicle; and
   a memory device having a first memory configured to store states of the vehicle and having a second memory configured to store positions, wherein
      the control device is in a form such that the control device compares the ascertained state of the vehicle with the states of the vehicle that are stored in the first memory and compares the ascertained position of the vehicle with the positions of the vehicle that are stored in the second memory,
      the control device is in a form such that the control device displays the information on the display device when the control device establishes that the ascertained state of the vehicle matches a state that is stored in the first memory and/or the ascertained position of the vehicle matches a position that is stored in the second memory,
      the control device displays first pieces of the information on the display device when the control device establishes that the ascertained state of the vehicle changes from a state that is not stored in the first memory to the state that is stored in the first memory and/or when the control device establishes that the ascertained position of the vehicle changes from a position that is not stored in the second memory to the position that is stored in the second memory,
      the control device displays second information, which is different than the first information, on the display device when the control device establishes that the ascertained state of the vehicle changes from the state that is stored in the first memory to the state that is not stored in the first memory and/or when the control device establishes that the position of the vehicle changes from the position that is stored in the second memory to the position that is not stored in the second memory, and
      that control device displays the first data on the display device when the control device establishes that the ascertained state of the vehicle matches the state that is stored in the first memory and the ascertained position of the vehicle matches the position that is stored in the second memory.

2. The vehicle assistance apparatus as claimed in claim 1, further comprising a transmission device configured to send a request to the external device to send the first data.

3. The vehicle assistance apparatus as claimed in claim 2, wherein the control device is in a form such that the control device displays second data, which are provided by the sensor device, on the display device when the control device establishes that the ascertained state of the vehicle matches the state that is stored in the first memory and/or the ascertained position of the vehicle matches the position that is stored in the second memory.

4. The vehicle assistance apparatus as claimed in claim 3, further comprising: an input device configured to program the control device to display third data that denote a state of components of the vehicle or a state of objects that are not part of the vehicle or a state of the surroundings of the vehicle or an occurrence of events, wherein
   the control device is in a form that is programmable such that the control device takes the programming of the control device as a basis for displaying the third data on the display device when the control device establishes that the ascertained state of the vehicle matches the state that is stored in the first memory and/or the ascertained position of the vehicle matches the position that is stored in the second memory.

5. The vehicle assistance apparatus as claimed in claim 4, wherein the control device is in a form that is programmable such that the control device takes the programming of the control device as a basis for suppressing the display of the first and/or the second data on the display device when the control device establishes that the ascertained state of the vehicle matches the state that is stored in the first memory and/or the ascertained position of the vehicle matches the position that is stored in the second memory.

6. The vehicle assistance apparatus as claimed in claim 5, further comprising:
   an object recognition device configured to recognize objects in the vehicle, wherein
      the objects are components that are not associated with the vehicle, and
      the control device is in a form such that the control device displays the presence or the state of the object in the vehicle on the display device when the control device establishes that the ascertained state of the vehicle matches a state that is stored in the first memory and/or the ascertained position of the vehicle matches a position that is stored in the second memory.

7. The vehicle assistance apparatus as claimed in claim 6, further comprising:
   a sensor configured to ascertain a physical and/or psychic state of the driver, wherein
      the control device is in a form such that the control device selects the information for display on the display device on the basis of the ascertained state of the driver.

8. The vehicle assistance apparatus as claimed in claim 7, further comprising:
an interface configured to provide the first and/or second and/or third data for the control device.

9. A vehicle comprising: a vehicle assistance apparatus as claimed in claim 8.

10. A system for providing data for a vehicle assistance apparatus in a vehicle, comprising:
a vehicle as claimed in claim 9;
a device external to the vehicle configured to provide information for the vehicle assistance apparatus of the vehicle, wherein
the device configured to provide the information has a memory device for storing data,
the device configured to provide the information has a control device for selecting the information from the data stored in the memory device,
the control device is configured to select the information from the data stored in the memory device on the basis of the state of the vehicle as ascertained by the vehicle assistance apparatus and/or on the basis of the position of the vehicle as ascertained by the vehicle assistance apparatus, and
the device configured to provide the information sends the information to the vehicle assistance apparatus of the vehicle when the control device of the vehicle assistance apparatus has made a request to send the information to the device for providing the information.

11. The system as claimed in claim 10, further comprising:
at least one device external to the vehicle configured to produce the information, wherein
the information denotes a state of the at least one device configured to produce the information, and
the at least one device configured to produce the information is designed to send the information to the device configured to provide the information or to the vehicle assistance apparatus.

12. The system as claimed in claim 11, wherein the at least one external device is configured to produce the information is a residential house, a public or private company, a hotel/restaurant, a filling station, a shop, a service provider of public or private transport, a parking lot or a parking garage.

* * * * *